United States Patent [19]
Iihoshi et al.

[11] Patent Number: 5,982,321
[45] Date of Patent: Nov. 9, 1999

[54] FREQUENCY-MODULATED CONTINUOUS-WAVE RADAR SYSTEM

[75] Inventors: Akira Iihoshi; Jou Kojima, both of Wako, Japan

[73] Assignee: Honda Giken Kogyo Kabushiki Kaisha, Tokyo, Japan

[21] Appl. No.: 09/099,021

[22] Filed: Jun. 17, 1998

[30] Foreign Application Priority Data

Jun. 18, 1997 [JP] Japan .................................. 9-161347

[51] Int. Cl.$^6$ .............................. G01S 13/06; G01S 13/42
[52] U.S. Cl. .......................... 342/158; 342/70; 342/128; 342/133; 342/146
[58] Field of Search .............................. 342/158, 70, 107, 342/113, 128, 133, 135, 139, 141, 146, 157, 192, 196

[56] References Cited

U.S. PATENT DOCUMENTS

| | | | |
|---|---|---|---|
| 4,003,049 | 1/1977 | Sterzer et al. | 342/43 |
| 5,268,692 | 12/1993 | Grosch et al. | 342/70 |
| 5,369,409 | 11/1994 | Urabe et al. | 342/133 |
| 5,579,010 | 11/1996 | Iihoshi et al. | 342/70 |
| 5,606,737 | 2/1997 | Suzuki et al. | 455/319 |

FOREIGN PATENT DOCUMENTS

| | | |
|---|---|---|
| 7-098377 | 3/1995 | Japan . |
| 8-313626 | 11/1996 | Japan . |
| 8-320371 | 12/1996 | Japan . |

*Primary Examiner*—John B. Sotomayor
*Attorney, Agent, or Firm*—Lyon & Lyon LLP

[57] ABSTRACT

An FM signal generator generates a frequency-swept FM signal, which is radiated as a beam from a transmission and reception antenna. The transmission and reception antenna is angularly moved by an antenna actuator to scan the beam. An echo signal reflected from a target and a signal related to the frequency-swept FM signal are mixed into a beat signal, whose frequency spectrum is analyzed by a frequency analyzer. A target detector determines the distance up to the target based on the frequency spectrum of the beat signal. A BPF processor comprises a bandpass filter which extracts a frequency component corresponding to the distance up to the target from the beat signal. A bearing calculator compares the level of a signal that has passed through the BPF processor with a threshold level to determine a bearing and a width of the target.

18 Claims, 5 Drawing Sheets

FREQUENCY-MODULATED CONTINUOUS-WAVE RADAR SYSTEM

BACKGROUND OF THE INVENTION

1. Field of the Invention

The present invention relates to a frequency-modulated continuous-wave (FM-CW) radar system for scanning a beam transmitted from a radar antenna, and more particularly to an FM-CW radar system which is capable of accurately detecting both the bearing and width of a target.

2. Description of the Prior Art

U.S. Pat. No. 5,369,409 discloses a time-division multiplex radar system having a plurality of antennas arranged for radiating beams having substantially the same radiation patterns in overlapping relation to each other. The beam radiated from one of the antennas is reflected by a target, and the echo signal is received by another of the antennas, such that the radar system is functionally equivalent to a radar system configuration which has a virtual antenna added between each pair of adjacent ones of the existing antennas. The disclosed time-division multiplex radar system is capable of detecting a target highly accurately in a wide angular range with the limited number of antennas.

U.S. Pat. No. 5,579,010 reveals a multibeam radar apparatus having a multibeam transmitting and receiving means, a reception level storing means for successively detecting and storing the intensities of reflected waves from targets that are received in respective transmission and reception channels and the distances up to the targets, a multibeam pattern storing means for generating and storing a multibeam pattern matrix or its inverse matrix representing the squares of directivities of the transmitted beams and corresponding to the transmission and reception channels, and an inversely processing means for arranging the stored reception levels of substantially the same distance into rows or columns corresponding to the transmission and reception channels, and processing the reception levels based of the multibeam pattern matrix or its inverse matrix to calculate corrected values of the reception levels of the transmission and reception channels. The revealed multibeam radar apparatus can detect a number of reflective sources distributed in a two-dimensional space with high resolution according to a deconvolution process.

Conventional multibeam FM-CW radar apparatus have their bearing resolution depending on the number of multiple beams. Since the number of multiple beams is limited by the structure of antennas, it is desirable to detect the bearing of a target and the width thereof in a scanning direction highly accurately without increasing the number of multiple beams.

It would be possible for beam-scanning FM-CW radar apparatus to divide a beat signal into each scanning direction and frequency-analyze the beat signal for determining the distance to and the bearing of a target. However, since the frequency-analyzing process would be time-consuming if the number of divided beat signals were increased for increased bearing resolution, it is desirable to detect the bearing of a target and the width thereof in a scanning direction highly accurately without increasing the number of divided beat signals.

SUMMARY OF THE INVENTION

It is therefore an object of the present invention to provide an FM-CW radar system which is capable of accurately detecting both the bearing and width of a target.

According to the present invention, a frequency-modulated continuous-wave radar system includes transmitting means for radiating a frequency-swept frequency-modulated signal as a beam toward a target, receiving means for receiving an echo signal reflected by the target, mixing means for mixing the echo signal with a signal related to the frequency-swept frequency-modulated signal to generate a beat signal, means for extracting a frequency representing the distance up to the target from the frequency of the beat signal, scanning means for scanning the beam, a bandpass filter for filtering the beat signal, the bandpass filter having a central frequency which is the same as the frequency representing the distance up to the target, and detecting means for detecting a bearing and a width of the target based on an output signal from the bandpass filter and a direction in which the beam is scanned by the scanning means.

The detecting means should preferably comprise means for determining that the target exists if the output signal from the bandpass filter exceeds a predetermined threshold level.

If the output signal from the bandpass filter exceeds the predetermined threshold level, the bearing and the width of the target are detected.

The frequency-modulated continuous-wave radar system according to the present invention passes a beat signal through a bandpass filter whose central frequency is a frequency representing the distance up to a target. The bandpass filter can filter out beat signals representing targets present at different distances thereby to detect the respective bearings of the targets accurately. The frequency-modulated continuous-wave radar system is thus capable of accurately detecting the positions and shapes of targets with high bearing resolution in a relatively short period of time. The frequency-modulated continuous-wave radar system is also capable of accurately detecting the width in a scanning direction of a target based on the distance up to the target and a bearing angle range in which the target is detected.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
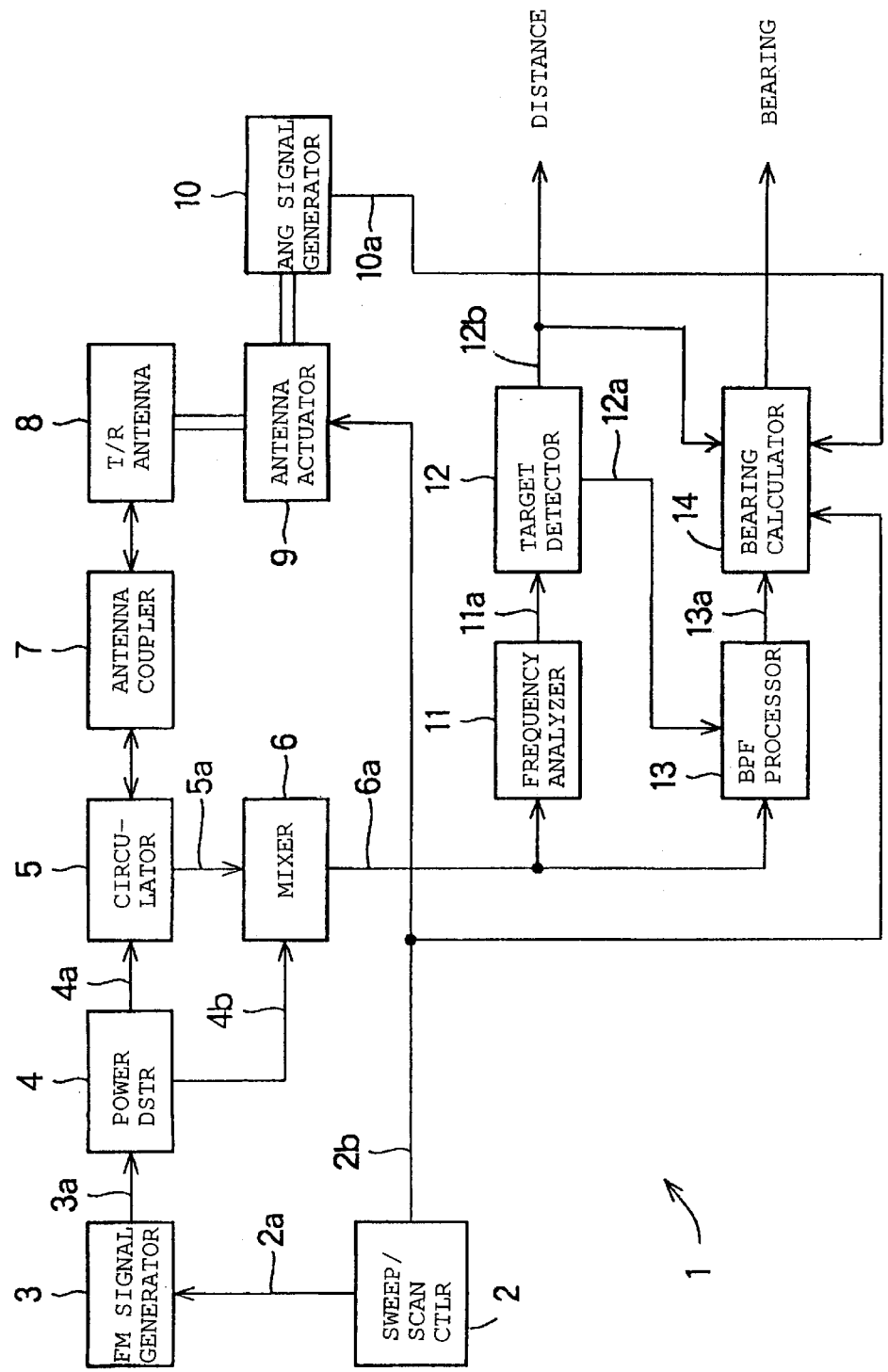
FIG. 1 is a block diagram of an FM-CW radar system according to the present invention.

As shown in FIG. 1, an FM-CW radar system according to the present invention comprises a sweep/scan controller 2, an FM signal generator 3, a power distributor 4, a circulator 5, a mixer 6, an antenna coupler 7, a transmission and reception antenna 8, an antenna actuator 9, an angle signal generator 10, a frequency analyzer 11, a target detector 12, a BPF (bandpass filter) processor 13, and a bearing calculator 14.

The sweep/scan controller 2 generates a voltage signal (modulation signal) 2a indicative of a transmitted frequency, the voltage signal 2a having a predetermined sweep period T and a triangular waveform. The generated voltage signal 2a is supplied to the FM signal generator 3.

The FM signal generator 3 has a voltagecontrolled oscillator for generating a high-frequency signal in a quasi-millimeter or a millimeter frequency range. Instead, the signal generator 3 may have a voltage-controlled oscillator for generating a high-frequency signal in a frequency range from about 30 GHz to 150 GHz.

The FM signal generator 3 generates an FM signal 3a (see FIG. 2B) based on the voltage signal 2a (see FIG. 2A) supplied from the sweep/scan controller 2. The FM signal 3a has its frequency range in the predetermined sweep period T. The FM signal 3a is supplied to the power distributor 4. The FM signal 3a increases in a frequency-up sweep mode in the former half of each cycle thereof and decreases in a frequency-down sweep mode in the later half of each cycle thereof.

The power distributor 4 distributes the FM signal 3a as a transmission signal 4a to the circulator 5 and a local oscillation signal 4b to the mixer 6.

The circulator 5 supplies the transmission signal 4a through the antenna coupler 7 to the transmission and reception antenna 8, which radiates an FM radar beam wave. The radiated FM radar beam wave is reflected by a target and received as an echo wave in the transmission and reception antenna 8. The transmission and reception antenna 8 supplies an echo signal through the antenna coupler 7 to the circulator 5.

The circulator 5 separates a reception signal 5a from the echo signal, and supplies the reception signal 5a to the mixer 6.

The mixer 6 mixes the reception signal 5a with the local oscillation signal 4b, producing a beat signal 6a whose frequency is equal to the difference between the frequency of the local oscillation signal 4b and the frequency of the reception signal 5a.

The beat signal 6a is supplied to the frequency analyzer 11 and the BPF processor 13.

The antenna coupler 7 comprises a rotary joint.

However, if the transmission and reception antenna 8 is angularly movable in a predetermined angular search range, then the antenna coupler 7 may comprise a flexible waveguide.

The transmission and reception antenna 8 is of such a structure which radiates an FM radar beam wave having a certain beam width.

The antenna actuator 9 angularly moves or swings the transmission and reception antenna 8 about a given axis based on a scanning permission signal 2b (see FIG. 2C) supplied from the sweep/scan controller 2.

The angle signal generator 10 detects an angular displacement of the transmission and reception antenna 8, and generates an angle signal 10a which represents the direction in which a main beam is radiated from the transmission and reception antenna 8.

Figure 2:
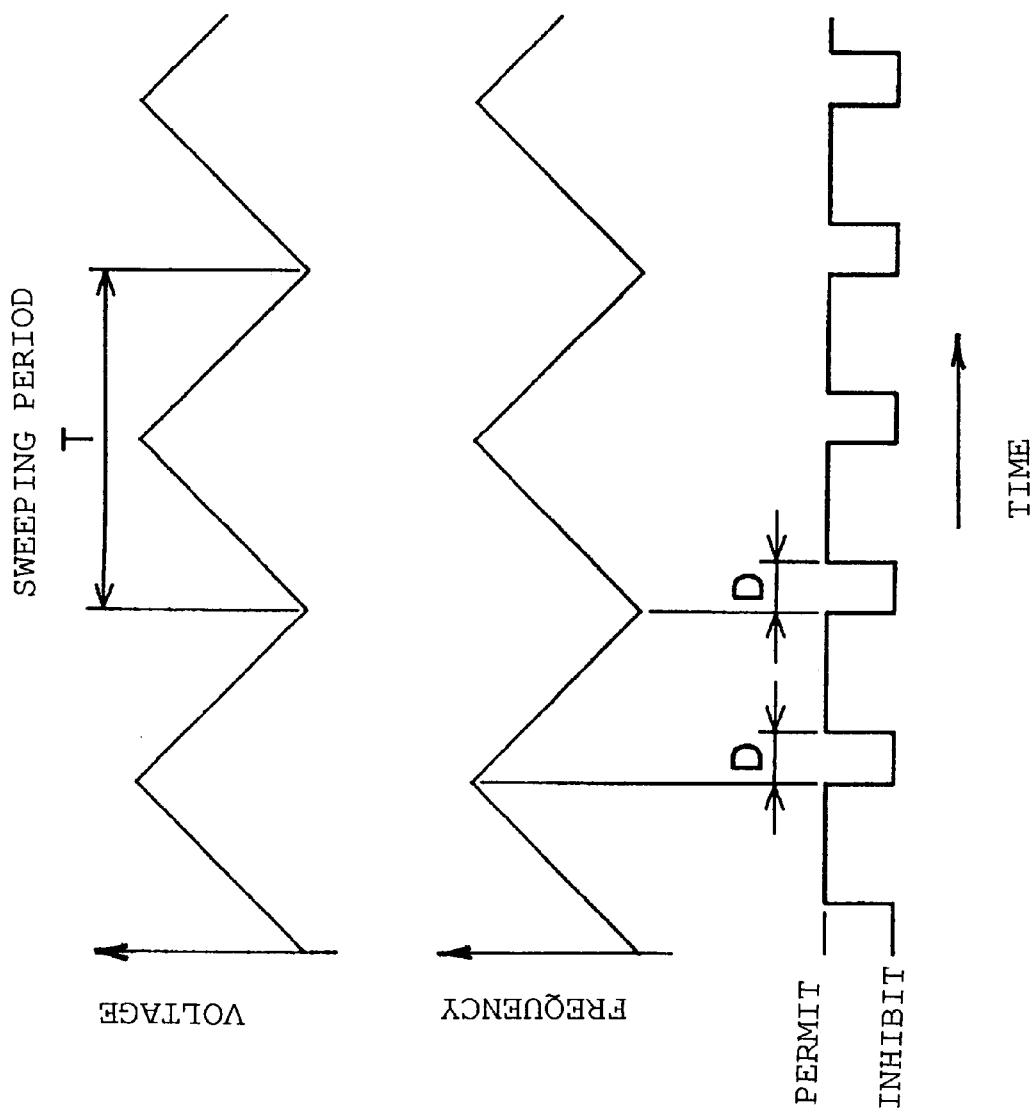
FIG. 2A is a diagram showing a voltage signal indicative of a transmitted frequency.
FIG. 2B is a diagram showing an FM signal.
FIG. 2C is a diagram showing a scanning permission signal.

As shown in FIG. 2C, the scanning permission signal 2b is not generated by the sweep/scan controller 2, inhibiting the scanning of the transmission and reception antenna 8 for a predetermined time D from the time when the frequency-up sweep mode switches to the frequency-down sweep mode in each cycle of the frequency signal 3a, and also for the predetermined time D from the time when the frequency-down sweep mode switches to the frequency-up sweep mode.

The time D is selected depending on a maximum distance which can be detected by the FM-CW radar system. For example, if the maximum detectable distance is 300 meters, then the time D is set to a period of time longer than 2 microseconds which a transmitted FM beam wave takes to return to the transmission and reception antenna 8 after being reflected by a target spaced 300 meters from the FM-CW radar system.

For example, no beat signal indicative of the distance up to a target is generated during a certain period in which an echo signal in the frequency-up sweep mode and a transmission signal in the frequency-down sweep mode are supplied to the mixer 6. Therefore, the scanning of the transmission and reception antenna 8 is stopped during such a period.

The antenna actuator 9 comprises an electric motor and a gear mechanism operatively connected between the electric motor and the transmission and reception antenna 8.

While the antenna actuator 9 is being supplied with the scanning permission signal 2b from the sweep/scan controller 2, the antenna actuator 9 angularly moves or swings the transmission and reception antenna 8. While the antenna actuator 9 is not being supplied with the scanning permission signal 2b from the sweep/scan controller 2, the antenna actuator 9 stops angular or swinging movement of the transmission and reception antenna 8, and holds the orientation of the transmission and reception antenna 8.

Alternatively, the antenna actuator 9 may rotate the transmission and reception antenna 8 through 360° or may angularly move the transmission and reception antenna 8 through a certain angle, e.g., of several tens of degrees, during a period of time in which it is supplied with the scanning permission signal 2b once.

Each time the antenna actuator 9 is supplied with the scanning permission signal 2b once or a plurality of times, the antenna actuator 9 may angularly move the transmission and reception antenna 8 through a certain angle.

For example, each time the antenna actuator 9 is supplied with the scanning permission signal 2b twice, the antenna actuator 9 may angularly move the transmission and reception antenna 8 through 1°, for example. When the transmission and reception antenna 8 is thus angularly moved, the FM-CW radar system can detect a target while the frequency of the FM signal is being swept in both the frequency-up sweep mode and the frequency-down sweep mode with respect to one bearing.

When the frequency of the FM signal is swept in both the frequency-up sweep mode and the frequency-down sweep mode with respect to one bearing and the frequency of a beat signal is measured in each of the frequency-up sweep mode and the frequency-down sweep mode, the FM-CW radar system can determine the distance up to a target and a relative speed with respect to the target.

If the period in which no beat signal indicative of the distance up to a target is produced is sufficiently short as compared with the speed at which the transmission and reception antenna 8 is angularly moved, i.e., the scanning speed of the transmission and reception antenna 8, so that an angular range incapable of detecting the target is very small, or any substantially blind angular range does not occur, then the antenna actuator 9 may angularly move or swing (scan) the transmission and reception antenna 8 irrespective of the sweeping timing of the FM signal 3a.

The orientation of the transmission and reception antenna 8 is detected by the angle signal generator 10, which generates an angle signal 10a representing the direction in which a main beam is radiated from the transmission and reception antenna 8. The angle signal 10a is supplied to the bearing calculator 14.

The frequency analyzer 11 comprises an A/D converter for converting the analog beat signal 6a to a digital signal and a frequency analyzing device such as a fast Fourier transform (FFT) unit or the like.

The frequency analyzer 11 analyzes the frequency spectrum of the beat signal in a full scanning range.

The frequency analyzer 11 may be supplied with the angle signal 10a and the scanning permission signal 2b, reads the beat signal in the full scanning range while being supplied with the scanning permission signal 2b, analyze the read beat signal, and output the analyzed frequency spectrum.

Alternatively, the frequency analyzer 11 may analyze the frequency spectrum of the beat signal in each scanning angle, and output the analyzed frequency spectrum.

The target detector 12 determines a peak frequency of the frequency spectrum based on frequency spectrum data 11a supplied from the frequency analyzer 11, outputs frequency data 12a of the peak frequency, calculates the distance up to a target from the peak frequency, and outputs calculated distance data 12b to the bearing calculator 14 or an external device.

If the frequency spectrum contains a plurality of peak frequencies, then the target detector 12 outputs frequency data 12a of each of the peak frequencies.

The frequency data 12a of the peak frequency is supplied from the target detector 12 to the BPF processor 13.

The BPF processor 13 provides a bandpass filter with the supplied frequency as its central frequency, and passes a beat signal of that frequency. In this manner, the BPF processor 13 extracts only the beat signal of the frequency corresponding to the distance up to the detected target, with the bandpass filter.

A beat signal 13a that has passed through the BPF processor 13, i.e., an output signal 13a of the BPF processor 13, is supplied to the bearing calculator 14.

The bearing calculator 14 compares the level of the output signal 13a of the BPF processor 13 with a predetermined threshold level, and outputs a range in which the level of the output signal 13a exceeds the threshold level, as a bearing where the target exists.

The bearing calculator 14 compares the level of the output signal 13a with the threshold level only during the period in which a beat signal indicative of the distance up to a target is generated on the basis of the scanning permission signal 2b.

The bearing calculator 14 outputs the bearing where the target exists based on the angle signal 10a.

The bearing calculator 14 can calculate the width of the target in the scanning direction from the distance data and the bearing data, and output the calculated width of the target.

If there are a plurality of targets present at the same distance, then the bearing calculator 14 may calculate and output the distance between the targets.

Operation of the frequency analyzer 11, the target detector 12, the BPF processor 13, and the bearing calculator 14 will be described below with reference to FIGS. 3 through 7.

Figure 3:
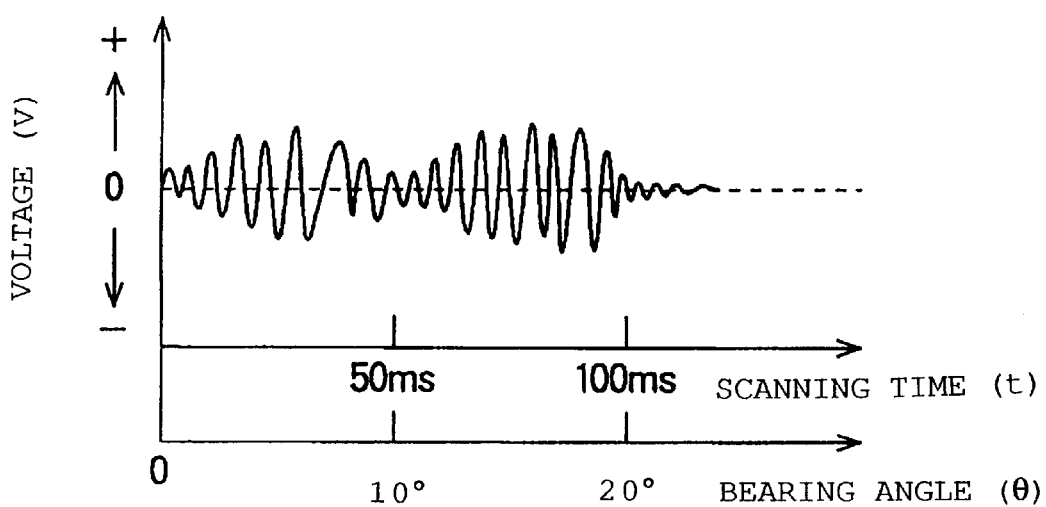
FIG. 3 is a diagram showing a beat signal from two targets.

FIG. 3 shows a beat signal which is produced when there are two targets.

If the transmission and reception antenna 8 is scanned at a constant scanning speed, then a scanning time t and a bearing angle θ are proportional to each other. FIG. 3 shows a beat signal produced when the transmission and reception antenna 8 is scanned at a constant scanning speed. The beat signal shown in FIG. 3 contains echo waves reflected from two targets that are spaced at different distances from the transmission and reception antenna 8.

The beat signal shown in FIG. 3 is frequency-analyzed by the frequency analyzer 11, which produces a frequency spectrum.

Figure 4:
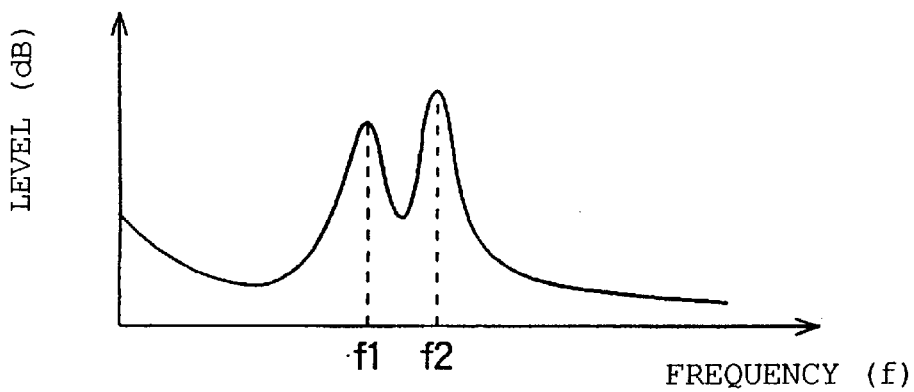
FIG. 4 is a graph showing the result of a frequency analysis effected on the beat signal shown in FIG. 3.

FIG. 4 shows the result of the frequency analysis effected on the beat signal shown in FIG. 3 by the frequency analyzer 11. The result shown in FIG. 4 indicates that the entire beat signal is subjected to the fast Fourier transform.

However, a plurality of frequency analysis regions (bearings) may be established, and a frequency analysis may be effected in each of the frequency analysis regions. If the FM-CW radar system is used as a vehicle-mounted radar system, then a beat frequency in the direction in which the vehicle is moving may be supplied to the BPF processor 13.

The target detector 12 searches for a frequency at which the level of the beat frequency has a peak based on the result of the frequency analysis shown in FIG. 4. Specifically, the target detector 12 searches for a peak of the curve shown in FIG. 4. In the FM-CW radar system, since the frequency is proportional to the distance, the number of peaks of the curve represents the number of targets, and a peak frequency represents the distance up to a target. The data of the peak frequency is supplied to the BPF processor 13.

The BPF processor 13 provides a bandpass filter whose central frequency is the supplied peak frequency, and filters the beat signal 6a supplied from the mixer 6.

If there are a plurality of targets, then the BPF processor 13 is supplied with the data of a plurality of peak frequencies, and filters the beat signal 6a at the peak frequencies.

The BPF processor 13 may be hardware-implemented or software-implemented according to a program using a DSP (digital signal processor), a high-speed processor, or the like.

The BPF processor 13 may store the data of the peak frequency outputted in a previous cycle, and filter the beat signal 6a with the stored data of the peak frequency concurrently with the frequency analysis effected on the frequency spectrum of the beat signal 6a in the present cycle by the frequency analyzer 11.

Figure 5:
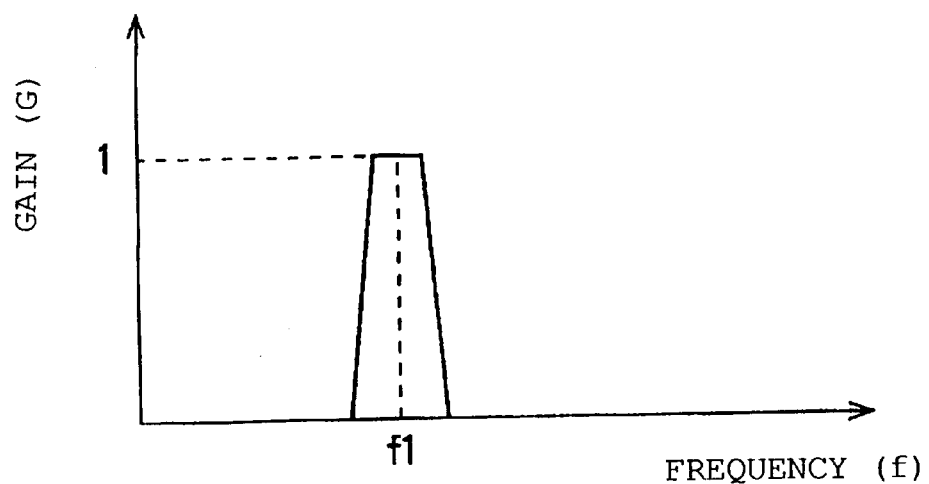
FIG. 5 is a diagram showing the frequency vs. gain characteristics of a bandpass filter having a central frequency of f1.
Figure 6:
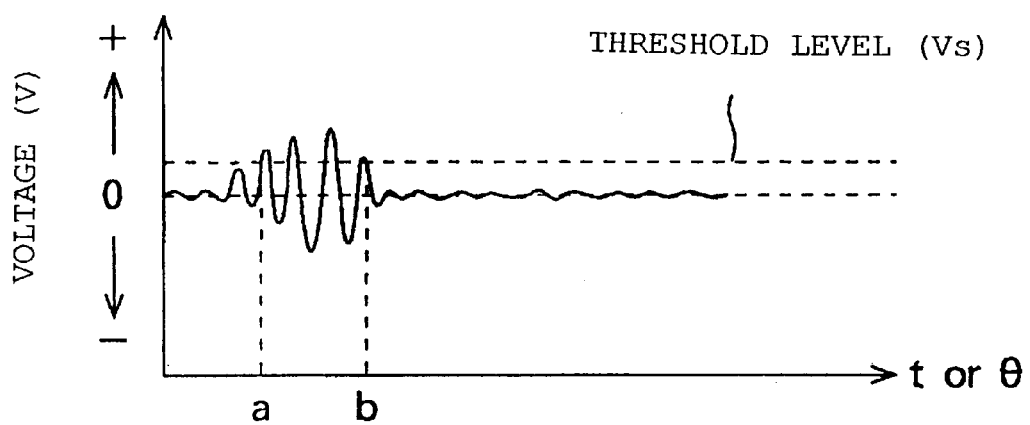
FIG. 6 is a diagram showing the waveform of a beat signal that has passed through the bandpass filter having the central frequency of f1, the diagram being illustrative of a process of detecting the bearing of a target.

FIG. 5 shows the frequency vs. gain characteristics of the bandpass filter, and FIG. 6 shows the waveform of the beat signal 13a that has passed through the BPF processor 13.

The beat signal 13a that has passed through the BPF processor 13 contains a signal component in the passband shown in FIG. 5. Therefore, it is possible from the beat signal 13a to determine the level of the echo wave in the scanning direction reflected from a target that exists at a distance corresponding to the frequency of the signal component.

Accordingly, as show in FIG. 6, the bearing calculator 14 can calculate a range from a point ※a※ where the level of the beat signal 13a starts to exceed a predetermined threshold level Vs to a point ※b※ where the level of the beat signal 13a drops below the predetermined threshold level Vs, as a bearing where the target exists.

Figure 7:
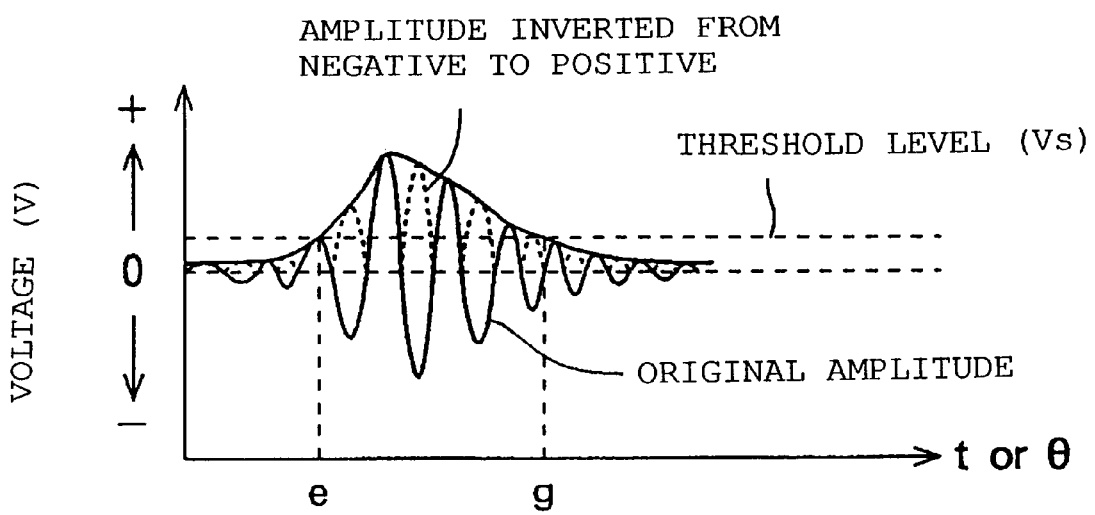
FIG. 7 is a diagram illustrative of another process of detecting the bearing of a target.

As shown in FIG. 7, the bearing calculator 14 may invert negative amplitude values of the beat signal 13a from the BPF processor 13 to positive amplitude values, determine an amplitude envelope of the original and converted positive values, and calculate a range (e–g) in which the determined amplitude envelope exceeds a threshold level Vs as a bearing where the target exists.

The bearing calculator 14 may change the threshold level Vs depending on the distance to be detected.

In view of the fact that the transmitted beam is attenuated with distance, the bearing calculator 14 may set the threshold level Vs to a higher value for detecting shorter distances and to a lower value for detecting longer distances, so that targets present at various distances and their widths can be detected with high accuracy.

In the above embodiment, the transmission and reception antenna 8 is mechanically scanned by the antenna actuator 9. However, the transmission and reception antenna 8 may comprise an electronically scanned antenna.

As described above, the FM-CW radar system according to the present invention passes a beat signal through a bandpass filter whose central frequency is a frequency representing the distance up to a target. The bandpass filter can filter out beat signals representing targets present at different distances thereby to detect the respective bearings of the targets. The FM-CW radar system is thus capable of accurately detecting the positions and shapes of targets with high bearing resolution in a relatively short period of time. The FM-CW radar system is also capable of accurately detecting the width in a scanning direction of a target based on the distance up to the target and a bearing angle range in which the target is detected.

If the FM-CW radar system is used as a radar system mounted on a vehicle, then the FM-CW radar system can accurately detect the distance between a plurality of vehicles or obstacles that are positioned at substantially the same distance ahead of the vehicle, allowing the driver of the vehicle to decide whether the vehicle can pass between those vehicles or obstacles.

Although a certain preferred embodiment of the present invention have been shown and described in detail, it should be understood that various changes and modifications may be made therein without departing from the scope of the appended claims.

What is claimed is:

1. A frequency-modulated continuous-wave radar system comprising:
   transmitting antenna for radiating a frequency-swept frequency-modulated signal as a beam toward a target;
   receiving antenna for receiving an echo signal reflected by the target;
   mixer for mixing the echo signal with a signal related to said frequency-swept frequency-modulated signal to generate a beat signal;
   a target detector for extracting a frequency representing the distance up to the target from the frequency of said beat signal;
   scanning means for scanning said beam;
   a BPF processor for filtering said beat signal, said BPF processor having a central frequency which is the same as said frequency representing the distance up to the target; and
   a bearing calculator for detecting a bearing and a width of the target based on an output signal from said BPF processor and a direction in which said beam is scanned by said scanning means.

2. A frequency-modulated continuous-wave radar system according to claim 1, wherein said bearing calculator means comprises means for determining that the target exists if the output signal from said BPF processor exceeds a predetermined threshold level.

3. A frequency-modulated continuous-wave radar system according to claim 1, wherein said scanning means is an antenna actuator.

4. A frequency-modulated continuous-wave radar system according to claim 1, further comprising antenna angle signal generator for generating an angle signal of transmitting or receiving antenna.

5. A frequency-modulated continuous-wave radar system according to claim 1, further comprising a frequency analyzer for analyzing frequency spectra of said beat signal.

6. A frequency-modulated continuous-wave radar system according to claim 1, wherein said target detector has function for controlling central frequency of said BPF processor.

7. A frequency-modulated continuous-wave radar system comprising:
   a transmitting and receiving antenna for radiating a frequency-swept frequency modulated signal as a beam toward a target and for receiving an echo signal reflected by the target;
   a mixer for mixing the echo signal with a signal related to said frequency-swept frequency-modulated signal to generate a beat signal;
   a target detector for extracting a frequency representing the distance up to the target from the frequency of said beat signal;
   a scanner for scanning said beam;
   a processor for filtering said beat signal, said processor having a central frequency which is the same as said frequency representing the distance up to the target; and
   a bearing calculator for detecting a bearing and a width of the target based on an output signal from said processor and a direction in which said beam is scanned by said scanner.

8. A frequency-modulated continuous-wave radar system according to claim 7, wherein said bearing calculator means determines that the target exists if the output signal from said processor exceeds a predetermined threshold level.

9. A frequency-modulated continuous-wave radar system according to claim 7, wherein said scanner is an antenna actuator.

10. A frequency-modulated continuous-wave radar system according to the claims 7, wherein the transmitting and receiving antenna comprises transmitting and receiving antennas, and further comprising an antenna angle signal generator for generating an angle signal of the transmitting or receiving antenna.

11. A frequency-modulated continuous-wave radar system according to claim 7, further comprising a frequency analyzer for analyzing frequency spectra of said beat signal.

12. A frequency-modulated continuous-wave radar system according to claim 7 wherein said target detector controls the central frequency of said processor.

13. A frequency-modulated continuous-wave radar system according to claim 7 wherein the scanner scans the antenna at a constant scanning speed, and the bearing calculator can determine the spacing of two targets based on echo waves reflected from the two targets.

14. A frequency-modulated continuous-wave radar method comprising:

transmitting from an antenna a frequency-swept frequency-modulated signal as a beam toward a target;

receiving from an antenna an echo signal reflected by the target;

mixing the echo signal with a signal related to said frequency-swept frequency-modulated signal to generate a beat signal;

extracting a frequency representing the distance up to the target from the frequency of said beat signal;

scanning said beam;

filtering said beat signal with a processor having a central frequency which is the same as said frequency representing the distance up to the target; and detecting a bearing and a width of the target based on an output signal from said processor and a direction in which said beam is scanned.

15. A method as in claim 1 further including determining that the target exists if the output signal from said processor exceeds a predetermined threshold level.

16. A method as in claim 14 further including generating an angle signal of the transmitting or receiving antenna.

17. A method as in claim 14 further comprising analyzing the frequency spectra of said beat signal.

18. A method as in claim 14 further including controlling the central frequency of said processor.

* * * * *

UNITED STATES PATENT AND TRADEMARK OFFICE
CERTIFICATE OF CORRECTION

PATENT NO     : 5,982,321
DATED         : November 9, 1999
INVENTOR(S)   : Akira Iihoshi et al.

It is certified that error appears in the above-identified patent and that said Letters Patent are hereby corrected as shown below:

Column 3, line 12, please change "voltagecontrolled" to -- voltage-controlled --.

Column 6, line 65, please change " ※a※ " to -- "a" --.

Column 6, line 67, please change " ※b※ " to -- "b" --.

Column 8, line 25, please change "frequency modulated" to -- frequency-modulated --.

Signed and Sealed this

Twenty-second Day of May, 2001

Attest:

NICHOLAS P. GODICI

Attesting Officer

Acting Director of the United States Patent and Trademark Office